United States Patent
Markstedt et al.

(10) Patent No.: US 9,682,874 B2
(45) Date of Patent: Jun. 20, 2017

(54) CLEANING SYSTEM FOR A BALLAST WATER TREATMENT SYSTEM

(71) Applicant: AlfaWall Aktiebolag, Tumba (SE)

(72) Inventors: Johan Markstedt, Farsta (SE); Staffan Cavalli-Björkman, Stockholm (SE); Peter Sahlén, Hässelby (SE)

(73) Assignee: ALFAWALL AKTIEBOLAG, Tumba (SE)

( * ) Notice: Subject to any disclaimer, the term of this patent is extended or adjusted under 35 U.S.C. 154(b) by 0 days.

(21) Appl. No.: 14/873,693

(22) Filed: Oct. 2, 2015

(65) Prior Publication Data

US 2017/0096350 A1    Apr. 6, 2017

(51) Int. Cl.
*C02F 1/32* (2006.01)
*C02F 1/00* (2006.01)

(52) U.S. Cl.
CPC ............. *C02F 1/325* (2013.01); *C02F 1/008* (2013.01); *C02F 2201/001* (2013.01); *C02F 2201/324* (2013.01); *C02F 2201/326* (2013.01); *C02F 2209/42* (2013.01); *C02F 2209/44* (2013.01); *C02F 2303/04* (2013.01); *C02F 2303/20* (2013.01)

(58) Field of Classification Search
USPC .................................................. 250/455.11
See application file for complete search history.

(56) References Cited

U.S. PATENT DOCUMENTS

| | | |
|---|---|---|
| 3,448,745 A * | 6/1969 | Seeley ............... B08B 9/093 134/103.1 |
| 5,332,388 A | 7/1994 | Schuerch et al. |
| 6,940,075 B2 | 9/2005 | Schulz |
| 7,615,160 B2 | 11/2009 | Collins et al. |
| 7,838,845 B2 | 11/2010 | Abe et al. |
| 8,742,366 B2 | 6/2014 | Snowball |

(Continued)

FOREIGN PATENT DOCUMENTS

| | | |
|---|---|---|
| DE | 196 05 311 C1 | 12/1996 |
| WO | WO 2010/144019 A1 | 12/2010 |

OTHER PUBLICATIONS 3.4 CIP (cleaning-in-place) module; Prior to Oct. 2, 2015; 2 pages.

(Continued)

*Primary Examiner* — Phillip A Johnston
(74) *Attorney, Agent, or Firm* — Birch, Stewart, Kolasch & Birch, LLP

(57) ABSTRACT

A ballast water treatment system includes at least one UV-light reactor with at least one UV-lamp, an inlet line for ballast water to be treated connected to the reactor and an outlet line connected to the reactor. The system includes a cleaning system for periodic cleaning of the reactor, including a water inlet line connected to the reactor for supplying water, a container with concentrated CIP-liquid connected to the reactor, a CIP-liquid inlet line connecting the container to the reactor, a dosage pump arranged in the CIP-liquid inlet line for supplying a predetermined amount of concentrated CIP-liquid to the reactor to mix with the water, a circuit comprising the reactor and a pump arranged in the circuit for circulation of water mixed with the concentrated CIP-liquid.

19 Claims, 1 Drawing Sheet

(56) References Cited

U.S. PATENT DOCUMENTS

2009/0321365 A1* 12/2009 Eriksson .................. B63J 4/004
                                                           210/741
2013/0213899 A1*  8/2013 Fahs, II .................... C02F 1/30
                                                           210/748.01

OTHER PUBLICATIONS

MDD00204EN 1501, "Alfa Laval PureBallast 3.1 (Compact)", Prior to Oct. 2, 2015; 2 pages.

* cited by examiner

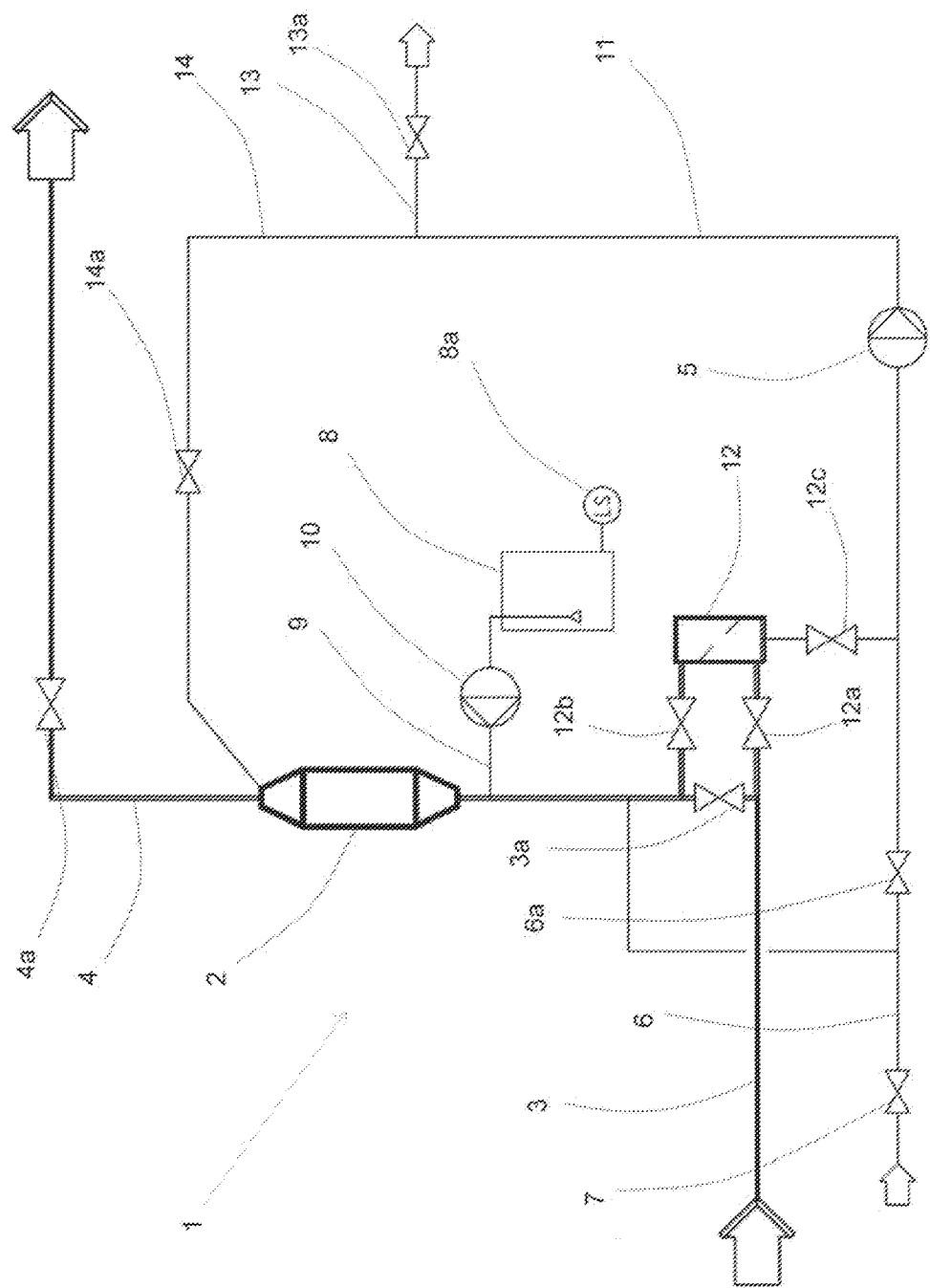

CLEANING SYSTEM FOR A BALLAST WATER TREATMENT SYSTEM

TECHNICAL FIELD

The present invention relates to a ballast water treatment system. In particular, the present invention relates to a ballast water treatment system with a cleaning system, i.e. a so called CIP-system (Cleaning-In-Place). The present invention also relates to a method of cleaning such a ballast water treatment system.

BACKGROUND

Over the last decades, the problem of accidentally moving living organisms in the ballast water of ships from one biotope to another in our oceans has been accentuated. Therefore, different solutions for treating the ballast water, to deactivate those organisms, have been suggested. Using UV-light to damage the DNA of the organism in question is a method widely used.

In a ballast water treatment system comprising UV-light reactors with UV-lamps, the glass tubes or quartz sleeves surrounding the area surrounding the UV-lamps get contaminated from sea substances and dead organisms during the ballast water treatment process. Thus, the performance of the UV-reactor decreases during this process and therefore, the deactivation of organisms in the ballast water is jeopardized.

Usually, this is taken care of by a cleaning system, a so called CIP-system (Cleaning in place), which intermittently during a stand-still in the operation of the reactor to be cleaned, circulates a liquid cleaning medium through the system, and the reactor in particular. The cleaning medium is usually a mixture of water and a cleaning liquid in a suitable concentration.

Cleaning systems according to the background art use a large tank in which the cleaning medium is mixed and at intervals used as described above.

In the shipping industry of today, it is vital that space that can be used for cargo purposes is not used up unnecessarily. Therefore, it is important to also build the ballast water treatment systems as compact as possible.

SUMMARY

It is an object of the present invention to provide a cleaning system for a ballast water treatment system that is more compact and comprises fewer elements, without jeopardizing the biological performance of the ballast water treatment system.

To fulfill these objects, a ballast water treatment system is provided comprising: at least one UV-light reactor with at least one UV-lamp; an inlet line for ballast water to be treated connected to the reactor; an outlet line connected to the reactor; and a cleaning system for periodic cleaning of the reactor, the cleaning system comprising: a water inlet line connected to the reactor for supplying water; a container for concentrated CIP-liquid connected to said reactor; a CIP-liquid inlet line connecting said container to the reactor; a dosage pump arranged in said CIP-liquid inlet line for supplying a predetermined amount of concentrated CIP-liquid to the reactor to mix with the water; and a circuit comprising said reactor and a pump arranged in said circuit for circulation of water and said amount concentrated CIP-liquid.

There is also provided a method of cleaning a ballast water treatment system comprising the steps of: draining sea water from the reactor; filling the reactor with water; feeding a predetermined amount of concentrated CIP-liquid to the reactor creating a cleaning medium mixture; at intervals, circulating the cleaning medium mixture in a circuit comprising the reactor; after a predetermined time period, draining the mixture from the reactor; and filling the reactor with water.

Due to the direct supply of the CIP-liquid to the reactor, fewer components are used. It is possible to reduce the size of the ballast water treatment system substantially. This leads to a smaller footprint in the area where the ballast system is installed, which leaves space for other purposes. The handling of the CIP-liquid, which often causes skin or eye irritation for the personnel aboard the ship, is now much easier. There is also less need to get exposed to open containers of CIP-liquid. The installation and maintenance is also simplified, e.g. there is no need for checking the pH of the cleaning mixture.

The container with concentrated CIP-liquid has a low level sensor, which triggers an alarm if the level is below a predetermined level. This makes it easy to determine when it is time to replace the old container with a new full one.

A UV-sensor mounted in the reactor measures the UV-radiation during the ballast and/or deballast processes, and triggers an alarm if the measured UV-radiation is a below a predetermined value. This enables the operator to determine if the cleaning process is working sufficiently.

The concentration of the cleaning medium mixture is in the interval of 1:50 to 1:300, more specifically in the interval of 1:150 to 1:250.

The cleaning may last for 10 to 15 hours, during which the circulation of the cleaning medium starts once every 15 minutes and lasts for 1-2 minutes.

Still other objectives, features, aspects and advantages of the invention will appear from the following detailed description, as well as from the drawings.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DRAWINGS

Embodiments of the present invention will now be described, by way of example, with reference to the accompanying schematic drawings, in which:

The FIGURE is a schematic view of a ballast water treatment system.

DETAILED DESCRIPTION

With reference to the FIGURE, a ballast water treatment system 1 is illustrated. The system comprises a UV-light reactor 2 with at least one UV-lamp. The reactor has one inlet line 3 for ballast water to be treated connected to the bottom of the reactor 2. At ballasting, a valve 3a is closed, directing the flow through a filter 12, by opening a valve 12a before the filter 12 and a valve 12b after the filter 12, before feeding the ballast water to the reactor 2. At deballasting, the valve 3a is opened and the valves 12a and 12b are closed, thus feeding the ballast water directly to the reactor without filtering. An outlet line 4 for discharging treated ballast water to the sea is connected to the top of the reactor 2.

The system 1 also comprises a cleaning-in-place system (CIP) for periodic cleaning of the reactor 2, and in particular the outer lamp surface subject to ballast water. This outer surface may be the outer surface of the glass tube of the lamp or a quartz sleeve protecting it. The cleaning system comprises an inlet line 6, for supplying water, which is connected to the bottom of the reactor 2. The water inlet line 6 is provided with a valve 7, which regulates (opens and closes) the supply of water. A CIP-liquid container 8 containing concentrated CIP-liquid is connected to the lower part of the reactor by a CIP-liquid inlet line 9. The CIP-liquid container 8 is easily replaceable by a connection that provides a handling of the CIP-liquid with a minimum of skin and eye irritation for the operator even if the liquid is concentrated and has a low pH-level. In order to bring down the size of the CIP-liquid container 8 and/or the need of replacement the concentration may be 100%. Lower concentrations lead of course to more frequent replacements of the CIP-liquid container 8 or the need of a larger container. The CIP-liquid container 8 has a low level sensor 8a for triggering an alarm, if the level of the concentrated CIP-liquid in the CIP-liquid container 8 is below a predetermined level. A dosage pump 10 arranged in the CIP-liquid inlet line 9 delivers a predetermined amount of concentrated CIP-liquid to the reactor 2.

A cleaning process is started by draining the water from the reactor 2. The pump 5 starts and a valve 6a upstream of the pump 5 is opened, as is a valve 13a in a drain line 13 downstream of the pump 5, through which the water is drained. The valve 7 is also closed and the water flows from the reactor 2, through the inlet line 6, and rge circulation line 11 and out the drain line 13. The pump 5 runs until the reactor 2 is empty.

The reactor is then filled with water by opening the valve 7 arranged in the water inlet line 6. The dosage pump 10 in the CIP-liquid inlet line 9 starts and feeds a predetermined amount of the CIP-liquid from the CIP-liquid container 8 to the reactor 2 via the CIP-liquid inlet line 9. The water and the CIP-liquid is thus mixed in the reactor. A typical cleaning process may last for 10 to 15 hours during which circulation of the cleaning medium starts once every 15 minutes and lasts for 1 minute, but other intervals may be used if the circumstances require it, e.g. if the deposits prove to be difficult to get rid of. Before the circulation step starts, the valve 14a in a circulation circuit 14 is opened. The cleaning medium mixture is then intermittently circulated in the circulation circuit 14 comprising the inlet line 6 and a circulation line 11 connected to said inlet line 6 and fed back to the reactor 2 by the pump 5. During the cleaning process, as can be understood from the FIGURE, the CIP-liquid container 8 is not included in the circulation circuit 14. When the whole cleaning process is finished the mixture is drained from the reactor 2 by starting the pump 5 and opening of valves 6a and 14a again and closing the valve 7. The cleaning process is completed by filling up the reactor 2 with water from the water inlet line 6 by opening the valve 7.

This cleaning process may use a concentration of CIP-liquid of 1:200. Other concentrations may be used, e.g. concentrations in the interval 1:50 to 1:300, preferably in the interval 1:150 to 1:250. Then the time cycle for the cleaning process and the circulation of the medium mixture may be modified to obtain the cleaning result required.

The cleaning process may be triggered by a UV-sensor mounted inside the reactor, which measures the UV-radiation during the ballast process. If the UV-value goes down, an alarm is triggered. This usually depends on soiled UV-lamps, but may also be the result of a faulty UV-lamp. In addition, a cleaning process may be started, automatically or manually. An alarm is also triggered by the non-functioning of the cleaning process.

During the cleaning process, the filter 12 may also be cleaned by the cleaning in place system. The circulation circuit 14 then incorporates the filter 12 by opening valve 12b and leading the cleaning medium through the filter 12 and a valve 12c via the pump 5 back to the reactor 2.

What is claimed is:

1. A ballast water treatment system comprising:
   at least one UV-light reactor with at least one UV-lamp;
   an inlet line for ballast water to be treated connected to the reactor;
   an inlet valve in the inlet line;
   an outlet line for discharging treated ballast water connected to the reactor;
   an outlet valve in the outlet line;
   a circulation line having a first end connect to the inlet line between the inlet valve and the reactor and a second end connected to the outlet line between the reactor and outlet valve;
   a circulation circuit formed by the circulation line, the reactor, the inlet line between the inlet valve and reactor and the outlet line between the reactor and outlet valve; and
   a cleaning system for periodic cleaning of the reactor, said cleaning system comprising:
   a water inlet line connected to the circulation circuit at a first location;
   a clean-in-place (CIP)-liquid container with concentrated CIP-liquid; and
   a CIP-liquid inlet line connected to the circulation circuit at a second location, the second location being different than the first location.

2. The ballast water treatment system according to claim 1, wherein the CIP-liquid container with concentrated CIP-liquid has a low level sensor configured to trigger an alarm, if a level of concentrated CIP-liquid in the CIP-liquid container is below a predetermined level.

3. The ballast water treatment system according to claim 1, wherein a UV-sensor mounted in the reactor measures the UV-radiation during the ballast and/or deballast processes, and triggers an alarm, if the measured UV-radiation is below a predetermined value.

4. The ballast water treatment system according to claim 2, wherein a UV-sensor mounted in the reactor measures the UV-radiation during the ballast and/or deballast processes, and triggers an alarm, if the measured UV-radiation is below a predetermined value.

5. A method of cleaning a ballast water treatment system comprising the steps of:
   draining sea water from a reactor of the ballast water treatment system;
   filling the reactor with water;
   feeding a predetermined amount of concentrated CIP-liquid to the reactor creating a cleaning medium mixture with the water in the reactor;
   at intervals, circulating the cleaning medium mixture in a circulation circuit comprising the reactor;
   after a predetermined time period draining the mixture from the reactor; and
   thereafter filling the reactor with water.

6. The method of cleaning a ballast water treatment system according to claim 5 wherein the concentration of the cleaning medium mixture is in the interval of 1:50 to 1:300.

7. The method of cleaning a ballast water treatment system according to claim 5, wherein the concentration of the cleaning medium mixture is in the interval 1:150 to 1:250.

8. The method of cleaning a ballast water treatment system according to claim 5, wherein said cleaning lasts for 10 to 15 hours during which the circulation of the cleaning medium starts once every 15 minutes and lasts for 1-2 minutes.

9. The method of cleaning a ballast water treatment system according to claim 6, wherein said cleaning lasts for 10 to 15 hours during which the circulation of the cleaning medium starts once every 15 minutes and lasts for 1-2 minutes.

10. The method of cleaning a ballast water treatment system according to claim 7, wherein said cleaning lasts for 10 to 15 hours during which the circulation of the cleaning medium starts once every 15 minutes and lasts for 1-2 minutes.

11. The ballast water treatment system according to claim 1, wherein the water inlet line is connected to the reactor.

12. The ballast water treatment system according to claim 1, wherein the CIP-liquid inlet line is connected to the reactor.

13. The ballast water treatment system according to claim 1, further comprising a ballast tank,
wherein the inlet line connects the ballast tank to the reactor.

14. The ballast water treatment system according to claim 1, further comprising a dosage pump arranged in said CIP-liquid inlet line for supplying a predetermined amount of concentrated CIP-liquid to the reactor to mix with the water from the water inlet line.

15. A method of cleaning a ballast water treatment system, comprising:
closing an inlet valve on an inlet line leading to a reactor;
closing an outlet valve in an outlet line extending from the reactor;
supplying water to a circulation circuit, the circulation circuit having a circulation line having one end connected to the inlet line between the inlet valve and reactor and a second end connected to the outlet line between the reactor and outlet valve;
supplying detergent to the circulation circuit; and
mixing the water and detergent in the circulation circuit.

16. The method of cleaning a ballast water treatment system according to claim 15, wherein the mixing occurs in the reactor.

17. The method of cleaning a ballast water treatment system according to claim 15, further comprising pumping the mixed water and detergent at several interval over time before removing the mixed water and detergent from the circulation circuit.

18. The method of cleaning a ballast water treatment system according to claim 15, further comprising draining the mixed water and detergent through a drain line in the circulation circuit.

19. The method of cleaning a ballast water treatment system according to claim 15, further comprising draining the inlet line and outlet line of ballast water before closing the outlet valve.

\* \* \* \* \*